UNITED STATES PATENT OFFICE.

JAMES H. STEBBINS, JR., OF NEW YORK, N. Y.

DYE-STUFF OR COLORING-MATTER.

SPECIFICATION forming part of Letters Patent No. 256,401, dated April 11, 1882.

Application filed February 6, 1882. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a scarlet-red dye-stuff produced by the action of diazoazo-benzole-monosulpho-acid upon the soda salt of naphthyl-sulphate.

In carrying out this invention I prepare first the soda salt of naphthyl-sulphate in the following manner: I take one part of finely-pulverized beta-naphthol and stir it together with three parts of strong sulphuric acid of 1.84 specific gravity. The reaction commences almost immediately and the temperature begins to rise, but care must be taken not to allow the temperature to rise much above 20° centigrade. The mass, which at the beginning is semi-liquid, solidifies after a short time into a crystalline condition, when the reaction is complete. The acid mixture so obtained is diluted with water and filtered in order to separate from it unchanged beta-naphthol, and it is then heated to boiling, neutralized with carbonate of lime, and filtered. The hot filtrate is treated with carbonate of soda, filtered, and the filtrate evaporated to dryness.

The compound thus obtained consists of the soda salt of a beta-naphthol-monosulpho-acid and the soda salt of naphthyl-sulphate, which can be readily separated by hot alcohol from the soda salt of beta-naphthol-monosulpho-acid. For this purpose I take one part of the finely-powdered compound and boil it for ten minutes in about four parts, by weight, of alcohol of ninety per cent., then filter hot. The soda salt of beta-naphthol-monosulpho-acid which remains on the filter is collected and set aside, the filtrate is put into a distilling apparatus, and the alcohol recovered by distillation. The residue thus obtained consists of the soda salt of naphthyl-sulphate, which I use for producing my new scarlet-red. I then take ten parts, by weight, of the soda salt of amidoazo-benzole-monosulpho-acid and dissolve it in two hundred parts of water and add three parts of nitrite of sodium, and afterward I add, little by little, under constant stirring, six parts of hydrochloric acid of 1.2 specific gravity. By these means the soda salt of amidoazo-benzole-monosulpho-acid is transformed into its diazo compound, (the soda salt of diazoazo-benzole-monosulpho-acid.) I add under constant stirring ten parts of the above-described soda salt of naphthyl-sulphate dissolved in fifty parts of water made alkaline with ten parts of aqua-ammonia, thereby forming the coloring-matter, which may be precipitated from the solution by the addition of an aqueous solution of common salt.

My new coloring-matter is easily soluble in water with a cherry-red color. It is less soluble in alcohol with a cherry-red color. It is also soluble in dilute oxalic acid with a scarlet-red color. It is insoluble in ether. In nitric acid it dissolves with a blue color, and when being heated the solution turns brown, and the dye becomes decomposed. Acetate of lead added to an aqueous solution of my dye produces a copious red precipitate, and dissolved alum added to the aqueous solution of my coloring-matter produces a slight red precipitate. It dyes wool in a bath acidulated with sulphuric acid a pure scarlet-red.

What I claim as new, and desire to secure by Letters Patent, is—

The dye-stuff or coloring-matter produced by the action of diazoazo-benzole-monosulpho-acid upon the soda salt of naphthyl-sulphate, substantially in the manner herein set forth.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.